Sept. 13, 1932.  H. BROWN  1,877,643

DEVICE FOR TESTING SENSORY AND MENTAL FACULTIES

Filed Jan. 14, 1932

INVENTOR
HAYDN BROWN
BY HIS ATTORNEYS

Patented Sept. 13, 1932

1,877,643

UNITED STATES PATENT OFFICE

HAYDN BROWN, OF LONDON, ENGLAND

DEVICE FOR TESTING SENSORY AND MENTAL FACULTIES

Application filed January 14, 1932, Serial No. 586,689, and in Great Britain January 21, 1931.

This invention relates to devices for testing sensory and mental faculties and has for its object to provide improved and simple devices which are eminently suitable for testing the faculty of the used to judge size by touch.

According to this invention the devices consist of a set of balls of graduated sizes and a tray having a centre pin upon which are loosely mounted radiating laths each having a hole adjacent its free end, the several holes being also of graduated sizes but each being of different size from that of the said balls.

Figure 1:
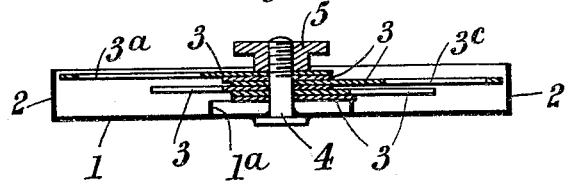
Figure 2:
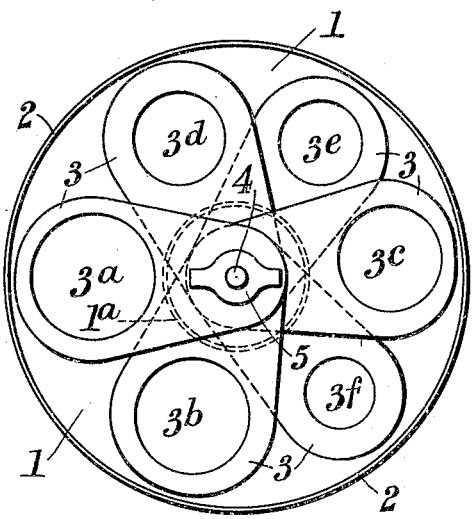
Figure 3:
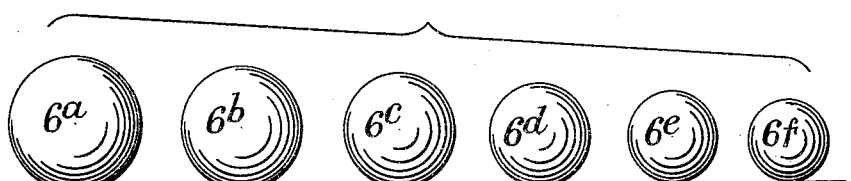

I will particularly describe this invention with reference to the accompanying drawing in which Figure 1 shews in section and Figure 2 in plan a tray constituting one of the elements of the device in accordance with this invention and Figure 3 a set of balls constituting the other element of the said device.

The tray in the example shewn consists of a circular base 1 having an upstanding flange 2 and radiating flat laths 3 mounted on a centre pin 4 secured to the said base, the said pin being screw-threaded to receive a wing-nut 5 for clamping the said laths, in any desired angular position relatively to each other, between it and a collar, or the equivalent, 1ᵃ on the said base. In the example shewn six radiating flat laths 3 are provided each of which has a hole (indicated at 3ᵃ, 3ᵇ, 3ᶜ, 3ᵈ, 3ᵉ and 3ᶠ in the respective laths) in its free, or outer, end, and each of the said laths extends radially outward as close as practicable to the inner surface of the upstanding flange 2. The holes in the laths 3 are of graduated size to receive the balls shewn in Figure 3 which are graduated in the same proportion, but are not necessarily of the same size, as the said holes.

The laths are purposely loosely mounted on the center pin within the tray in order that they may be moved into any position relatively to one another so that the holes can be arranged in any desired, regular, or irregular order of gradation.

Although each ball of the set of balls has its appropriate hole in the set of holes, the said holes are purposely made of such a size, or provided in such close proximity to the bottom of the tray, that the balls do not fit therein, in order not to provide any guide or indication to the person being tested as to the accuracy of his perceptions.

When the device is to be used, the person to be tested is blindfolded and handed the tray (having the holes in the laths arranged in the desired order of gradation) and the set of balls, whereupon he is required to judge by the sense of touch, the relative sizes of the balls and the relative sizes of the holes in the tray, and to place each ball in its appropriate hole, that is, the largest ball 6ᵃ in the largest hole 3ᵃ, the smallest ball 6ᶠ in the smallest hole 3ᶠ and the remaining balls 6ᵇ, 6ᶜ, 6ᵈ and 6ᵉ in their appropriate holes 3ᵇ, 3ᶜ, 3ᵈ and 3ᵉ respectively.

What I claim is:—

A device for testing sensory and mental faculties by touch, the said device consisting in a set of balls of graduated sizes and a tray having a centre pin upon which are loosely mounted radiating laths each having a hole adjacent its free end, the several holes being also of graduated sizes but each being of different size from that of the said balls.

In testimony whereof, I have signed my name to this specification at London, England, this 31st day of December 1931.

HAYDN BROWN.